United States Patent [19]
Kuwata et al.

[11] Patent Number: 5,170,274
[45] Date of Patent: Dec. 8, 1992

[54] OPTICAL TRANSMITTER

[75] Inventors: Naoki Kuwata, Yokohama; Hiroshi Nishimoto, Sagamihara, both of Japan

[73] Assignee: Fujitsu Limited, Kawasaki, Japan

[21] Appl. No.: 662,412

[22] Filed: Feb. 28, 1991

[30] Foreign Application Priority Data

Mar. 1, 1990 [JP] Japan .................................. 2-50189
Oct. 2, 1990 [JP] Japan .................................. 2-263104

[51] Int. Cl.⁵ .......................................... H04B 10/04
[52] U.S. Cl. ..................................... 359/182; 359/183
[58] Field of Search ............... 359/184, 185, 187, 182, 359/183; 385/2, 3

[56] References Cited

U.S. PATENT DOCUMENTS 4,471,494 9/1984 Keil et al. ............................ 359/182
4,893,352 1/1990 Welford ............................... 359/191
4,936,645 5/1990 Yoon et al. ............................ 385/2

OTHER PUBLICATIONS

Japanese laid-open Patent Publication No. 49-42365.

IOOC 1989, vol. 3, pp. 208-209.

Primary Examiner—Edward L. Coles, Sr.
Assistant Examiner—Rafael Bacares
Attorney, Agent, or Firm—Staas & Halsey

[57] ABSTRACT

An optical, transmitter with a stabilized operating point for an optical transmitter, especially for that including a Mach-Zehnder optical modulator, is disclosed. An optical modulator is provided which modulates a light beam from a light source according to a driving voltage from a drive circuit. An operating point stabilizing circuit is provided which detects a drift in the characteristic curve from the optical modulator and controls the optical modulator to bring the operating point to a specified position. Deterioration in the waveform of the output optical signal due to the operating point drift is thereby prevented without depending on the input signal. Further, by performing an operating point shift under specific conditions, deterioration in the waveform due to wavelength dispersion can be effectively prevented, whether the sign of the wavelength dispersion is positive or negative.

11 Claims, 18 Drawing Sheets

OPTICAL TRANSMITTER

BACKGROUND OF THE INVENTION

The present invention relates to an optical transmitter for use in optical communication systems and, more particularly, to an optical transmitter provided with an external optical modulator whereby wavelength chirping is prevented.

Conventionally, a direct modulation system, in which the current flowing through a laser diode is modulated with a data signal, has been in use as the optical transmitter in an optical communication system. In the direct modulation system, however, the effect of wavelength variation (chirping) of the optical signal output becomes greater as the transmission speed increases and hence long-distance transmission becomes difficult on account of wavelength dispersion within an optical fiber.

Therefore, optical transmitters have been studied which are provided with an optical modulator such as a Mach-Zehnder modulator, which produces little chirping from its principle. In order to achieve stabilized operations for a long time in an optical transmitter provided with such an optical modulator, it becomes necessary to keep the optical signal output therefrom stabilized under conditions of varying temperature and changing properties by aging.

A conventional optical transmitter provided with an optical modulator includes, for example, a light source formed of a laser diode or the like, an optical modulator for modulating the emitted light from the light source according to a driving voltage, thereby converting an input signal into an optical signal, and a drive circuit for generating the driving voltage according to the input signal.

In such an optical transmitter, a method has been proposed to compensate for deviation of the operating point of the optical modulator due to temperature variation and the like. In this method the modulator is driven with a signal having a low-frequency signal superposed on one side of the logic levels of the input signal, and the operating point is controlled according to the phase of the low-frequency signal detected from the optical signal output of the optical modulator (Japanese Laid-open Patent No. 42365/1974).

When using this method, however, the control of the optical modulator for keeping it at its optimum operating point has been difficult. This difficulty has been due to the occurrence of changes in the mark-space ratio of the input signal and increase in the rise time and fall time thereof. If the optimum operating point is not maintained, the waveform of the optical signal becomes deteriorated. Therefore, it is desired that a means be provided that does not rely on the input signal, of preventing the waveform of the output optical signal from being deteriorated due to a drift of the operating point.

Incidentally, it is confirmed that a wavelength variation is produced even in the Mach-Zehnder optical modulator and a waveform change is caused by wavelength dispersion in an optical fiber (T. Okiyama et al., "10 Gb/s Transmission in Large-Dispersion Fiber Using a Ti: LiNbO3 Mach-Zehnder Modulator", IOOC '89, Vol. 3, pp. 208-209). Since such wavelength variation causes improvement or deterioration in the waveform depending on the sign of the wavelength dispersion in the optical fiber, it is desired that an optical transmitter be provided which prevents the occurrence of such waveform deterioration irrespective of the sign of the wavelength dispersion be provided.

SUMMARY OF THE INVENTION

An object of the present invention is to provide an optical transmitter capable, without relying on the input signal, of preventing the waveform of the output optical signal from being deteriorated due to the operating point drift.

Another object of the present invention is to provide an optical transmitter capable of preventing waveform deterioration from occurring due to wavelength dispersion, regardless of whether the sign of the wavelength dispersion is positive or negative.

In a first aspect of the present invention, an optical transmitter is provided which is constructed as follows. A laser diode is provided, along with a drive circuit for generating a drive voltage in accordance with an input signal. A Mach-Zehnder optical modulator is provided which is responsive to the driving voltage for modulating a light beam from said laser diode, thereby converting the input signal into an optical. A low frequency oscillator is also provided for outputting a predetermined low-frequency signal. A low-frequency superposing circuit is provided for amplitude-modulating the input signal by superposing the low-frequency signal on a "0" logic level and a "1" logic level of the input signal such that a phase of the low-frequency signal at the "0" logic level and a phase of the low-frequency signal at the "1" logic level are opposite to each other and delivering the modulated signal to said drive circuit; an optical branching circuit for branching the optical signal output from said Mach-Zehnder optical modulator. A photoelectric converting circuit is provided for converting one of the optical signals branched by said optical branching circuit to an electrical signal. A phase detector circuit is provided for detecting a frequency component of the low-frequency signal included in the electrical signal and comparing a phase of the frequency component with a phase of the low-frequency signal, thereby outputting a D.C. signal of polarity corresponding to the phase difference and at a level corresponding to a drift in an operational characteristic curve of said Mach-Zehnder optical modulator. Finally, a bias control circuit for feedback-controlling a bias for said optical modulator so that the D.C. signal becomes zero.

Preferably, an operating point of said Mach-Zehnder optical modulator is controlled by changing a phase of lightwave in optical waveguides of said Mach-Zehnder optical modulator.

Preferably, said low-frequency superposing circuit includes an amplitude modulator for modulating an amplitude of the input signal with the low-frequency signal, and a filter for removing a low-frequency component from the amplitude modulated signal.

In an another aspect of the present invention, an optical transmitter is provided which is constructed as follows. A laser diode is provided, along with a drive circuit for generating a drive voltage in accordance with an input signal. A Mach-Zehnder optical modulator is provided which is responsive to the driving voltage for modulating a light beam from said laser diode, thereby converting the input signal into an optical signal. A low-frequency oscillator for outputting a predetermined low-frequency signal. A low-frequency superposing circuit is provided for amplitude-modulating the input signal with the low-frequency signal and delivering the modulated signal to said drive circuit. An optical branching circuit for branching the optical signal output from said Mach-Zehnder optical modulator. Also, a photoelectric converting circuit for converting one of the optical signals branched by said optical branching circuit to an electrical signal. A phase detector circuit for detecting a frequency component of the low-frequency signal included in the electrical signal and comparing a phase of the frequency component with a phase of the low-frequency signal, thereby outputting a D.C. signal of polarity corresponding to the phase difference and at a level corresponding to a drift in an operational characteristic curve of said Mach-Zehnder optical modulator. A bias control circuit for feedback-controlling a bias for said optical modulator so that the D.C. signal becomes zero. Finally an operating point shifting circuit responsive to an operating point switching signal for shifting an operating point of said Mach-Zehnder optical modulator by half a cycle on the operational characteristic curve.

Preferably, said Mach-Zehnder optical modulator has optical waveguides divided into two paths which have different phase-modulating efficiencies.

The above and other objects, features and advantages of the present invention and the manner of realizing them will become more apparent, and the invention itself will best be understood from a study of the following description and appended claims with reference had to the attached drawings showing some preferred embodiments of the invention.

DESCRIPTION OF THE PREFERRED EMBODIMENTS

Preferred embodiments of the present invention will be described below on the basis of the accompanying drawings.

Figure 1:
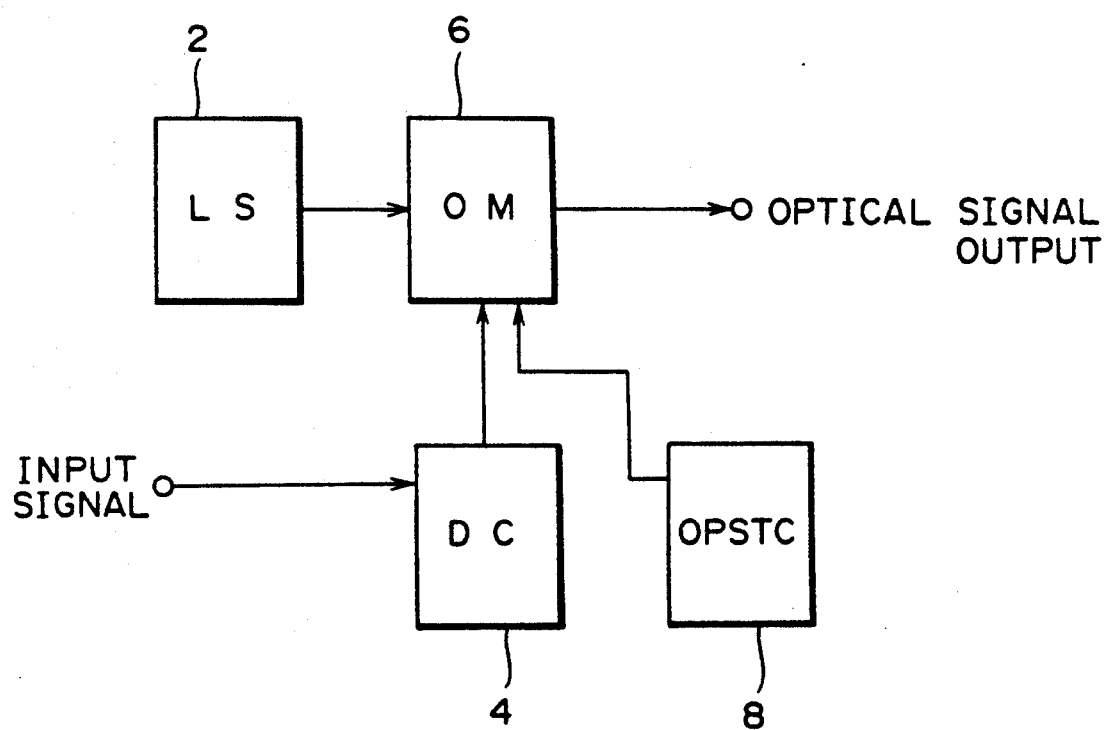
FIG. 1 is a block diagram showing a first basic fabrication of an optical transmitter provided for achieving the first object of the present invention.

FIG. 1 is a block diagram showing a first basic fabrication of an optical transmitter provided for achieving the first object of the present invention.

The optical transmitter comprises a light source 2, a drive circuit 4 for generating a driving voltage according to the input signal, an optical modulator 6 for modulating the light beam from the light source 2 according to the driving voltage, and thereby converting the input signal into an optical signal, and an operating point stabilizing circuit 8 for detecting a drift in the operational characteristic curve of the optical modulator 6 and controlling the optical modulator 6 such that the operating point is brought to a specified position with respect to the operational characteristic curve.

Preferably, the light source 2 is formed of a laser diode and the optical modulator 6 is formed of a Mach-Zehnder optical modulator.

Figure 2:
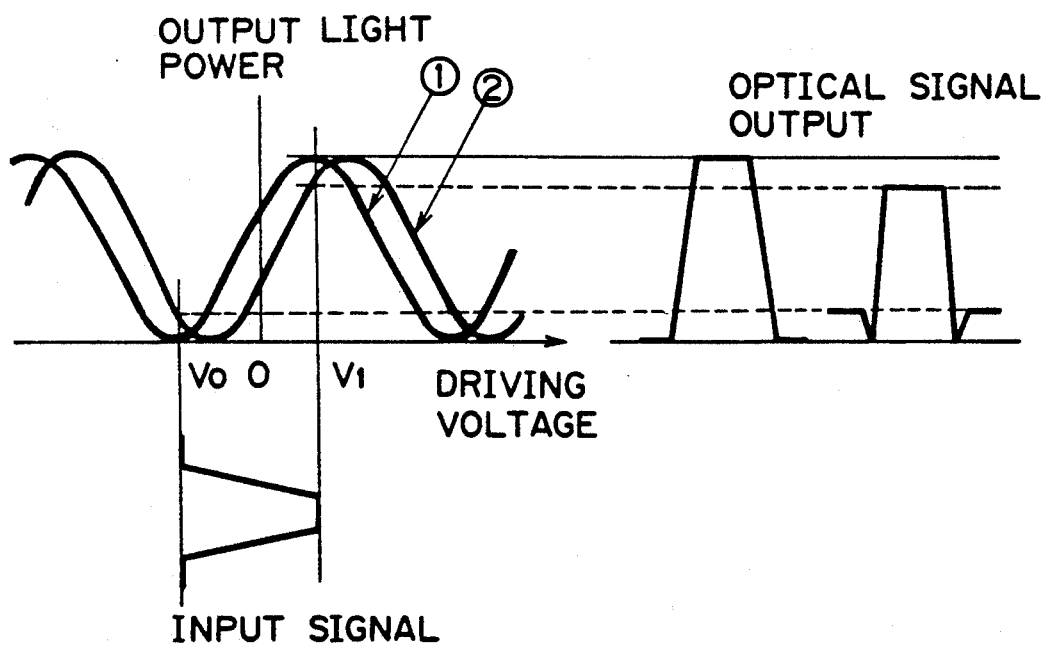
FIG. 2 is a block diagram showing an input-output characteristic of a Mach-Zehnder optical modulator.

FIG. 2 is a diagram showing an input-output characteristic of the Mach-Zehnder optical modulator. Referring to the diagram, ① indicates the operational characteristic curve before the operating point drift is produced and ② indicates the operational characteristic curve after the operating point drift has been produced. As shown in the diagram, the input-output characteristic of the Mach-Zehnder optical modulator has periodicity with respect to the driving voltage. Therefore, by using driving voltages V0 and V1 providing the minimum value and the maximum value of the output light power corresponding to each of the logical values, effective binary modulation can be achieved.

In such a Mach-Zehnder optical modulator, if the driving voltages V0 and V1 are kept constant when an operating point drift has occurred, the waveform becomes deteriorated on account of the above mentioned periodicity. According to the arrangement of the optical transmitter shown in FIG. 1, when an operating point drift has occurred, the operating point drift can be compensated for by changing the driving voltages V0 and V1 to V0+dV and V1+dV, respectively, where dV represents the drift quantity.

Figure 3:
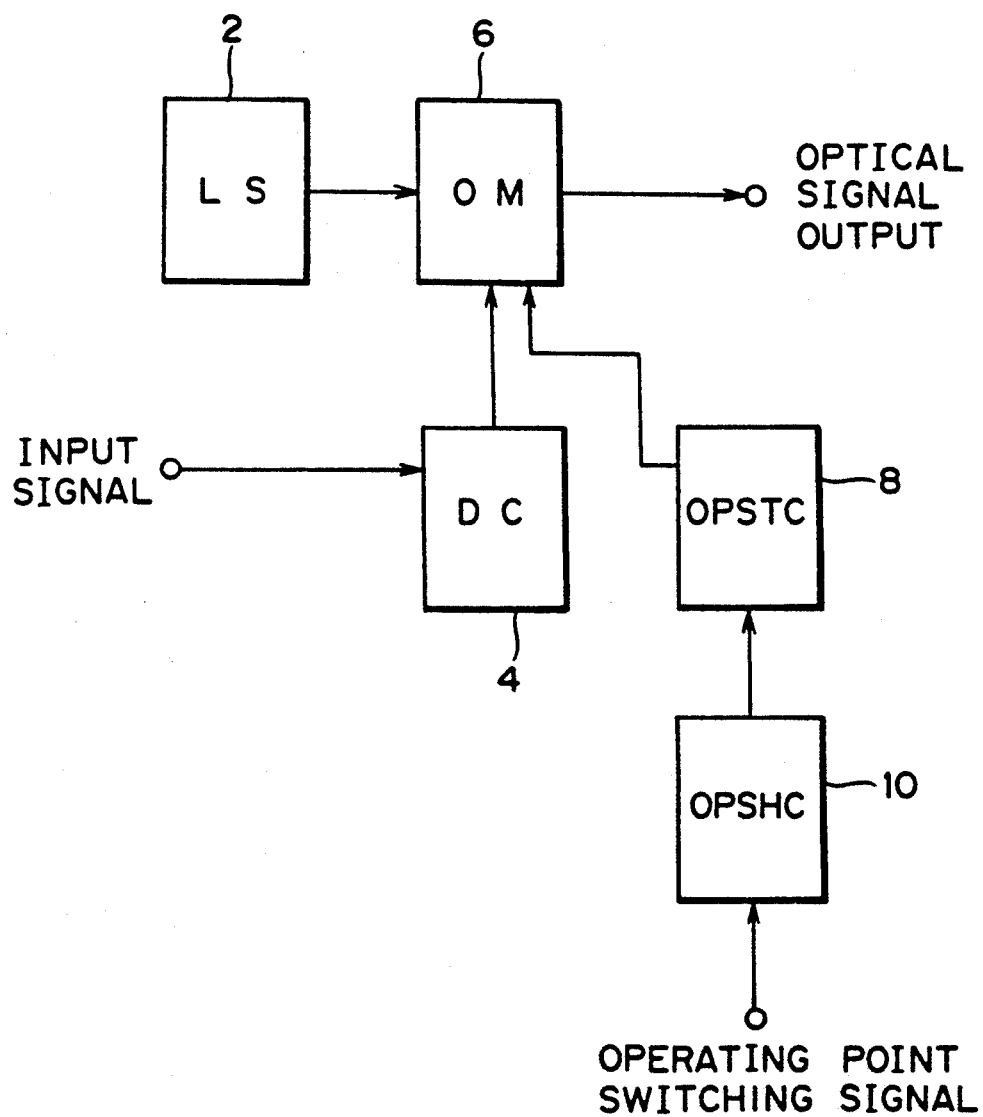
FIG. 3 is a block diagram showing a second basic fabrication of an optical transmitter provided for achieving the second object of the present invention.

FIG. 3 is a block diagram showing a second basic fabrication of an optical transmitter provided for achieving the second object of the present invention. This optical transmitter is obtained by having the structure shown in FIG. 1 further provided with an operating point shifting circuit 10 for shifting the operating point by half a cycle on the operational characteristic curve according to an operation point switching signal.

Preferably, the light source 2 is formed of a laser diode.

Preferably, the optical modulator 6 is formed of a Mach-Zehnder optical modulator having different phase-modulating efficiencies on its optical waveguides divided into two paths.

In the Mach-Zehnder optical modulator having different phase-modulating efficiencies on its optical waveguides divided into two paths, when the operating point is shifted by half a cycle on the operational characteristic curve, the initial phase difference on the two paths changes. Hence, it becomes possible to cause the phase of the light to lead or lag at the time of the rise of the optical pulse. Since the wavelength is instantly shortened when the phase leads and the wavelength is instantly lengthened when the phase lags, it becomes possible to effectively prevent the waveform deterioration due to wavelength dispersion.

Figure 4:
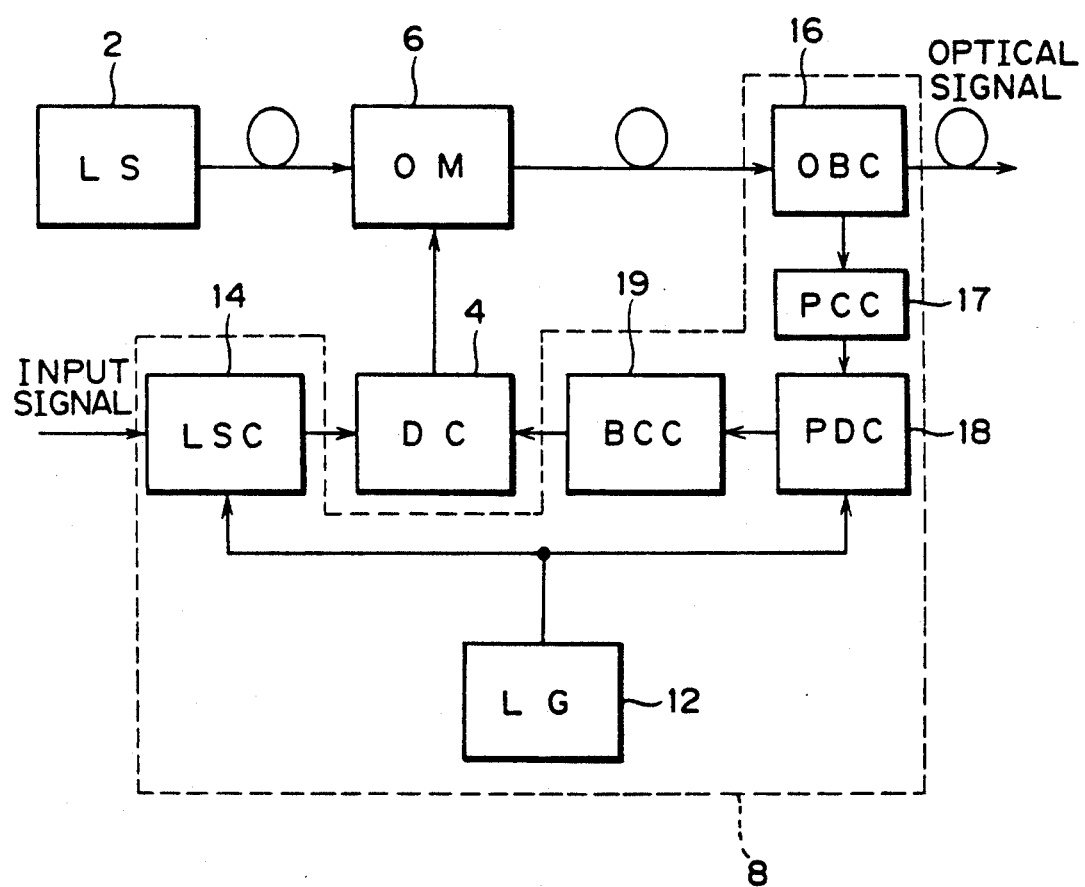
FIG. 4 is a block diagram showing an embodiment of the optical transmitter shown in FIG. 1.

Referring to FIG. 4, there is shown a block diagram of an embodiment of the optical transmitter of FIG. 1.

Referring to the figure, reference numeral 2 denotes a light source, 4 denotes a drive circuit for generating a driving voltage according to the input signal, 6 denotes an optical modulator for modulating an emitted light beam from the light source 2 thereby converting an input signal into an optical signal. In the present embodiment, an operating point stabilizing circuit 8 is constituted of a low-frequency generator 12 for outputting a predetermined low-frequency signal, a low-frequency superposing circuit 14 for amplitude-modulating the input signal by superposing the low-frequency signal on the "0" logic level and the "1" logic level of the input signal such that the phase of the low-frequency signal at the "0" logic level and the phase of the low-frequency signal at the "1" logic level are opposite to each other and delivering the modulated signal to the drive circuit 4, an optical branching circuit 16 for branching the optical signal output from the optical modulator 6, a photoelectric converting circuit 17 for converting one of the optical signals branched by the optical branching circuit 16 to an electrical signal, a phase detector circuit 18 for detecting the frequency component of the low-frequency signal included in the electrical signal and comparing the phase of the frequency component with the phase of the low-frequency signal, thereby outputting a D.C. signal of the polarity corresponding to the phase difference and at the level corresponding to the drift, and a bias control circuit 19 for feedback-controlling the bias for the optical modulator 6 so that the D.C. signal may become zero.

Figure 5:
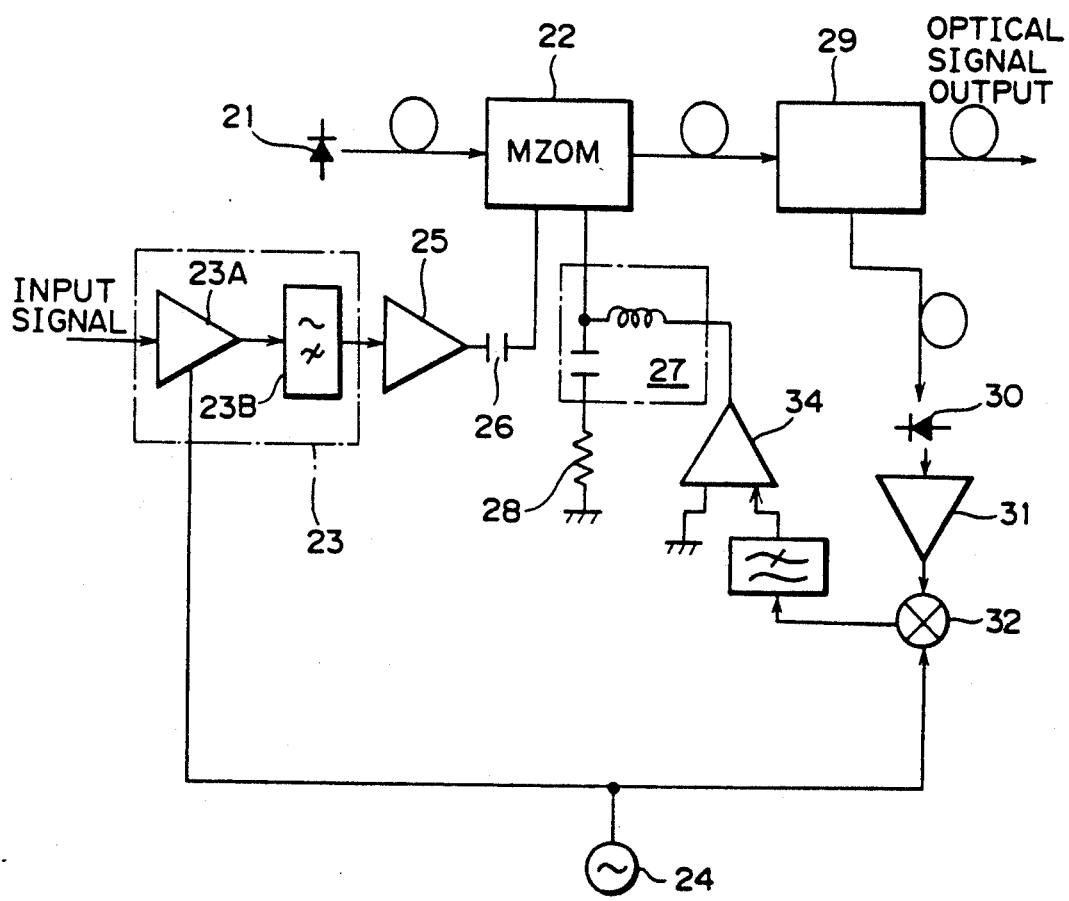
FIG. 5 is a circuit diagram of the optical transmitter shown in FIG. 4.

FIG. 5 is a particular circuit diagram of the optical transmitter shown in FIG. 4. A laser diode 21 as the light source supplies its emitted light to a Mach-Zehnder optical modulator 22 used as the optical modulator. A low-frequency superposing circuit 23 is supplied with the input signal and a low-frequency signal with a predetermined frequency (=f0) output from a low frequency generator (oscillator) 24, and the low-frequency superposing circuit 23 thereby amplitude-modulates the input signal with the low-frequency signal and outputs the modulated signal.

Details of the low-frequency superposing circuit 23 will be described below. The low-frequency signal is superposed on the "0" logic level and the "1" logic level of the input signal such that the phases of the low-frequency signal corresponding to the "0" level and the "1" level are opposite to each other. The low-frequency superposing circuit 23 includes an amplitude modulator 23A and a filter 23B. The amplitude modulator 23A modulates the amplitude of the input signal with the low-frequency signal, and the filter 23B removes the low-frequency component from the amplitude modulated signal. A variable gain amplifier can be used as the amplitude modulator 23A, for example. The output signal from the filter 23B is input to a drive amplifier 25 for obtaining a predetermined signal level and is also input, to one of the modulating input terminals of the Mach-Zehnder optical modulator 22 through a capacitor 26. The other modulating input terminal of the Mach-Zehnder optical modulator 22 is connected with a series connection of a bias tee 27 and a terminating resistor 28. The drive amplifier 25, capacitor 26, bias tee 27, and the terminating resistor 28 constitute the drive circuit of the Mach-Zehnder optical modulator 22.

The Mach-Zehnder optical modulator 22 modulates the emitted light beam from the laser diode 21 with the signal provided by the drive circuit, thereby converting it into an optical signal, and outputs the modulated signal.

The optical signal is input to an optical branching circuit 29, whereby a part thereof is branched off. The branched optical signal is input to a photodiode 30 performing photoelectric conversion, and the electric signal as the output thereof is input to one input terminal of a mixer 32 through a band amplifier 31 for selectively amplifying the frequency component of the electric signal with the frequency f0. The other input terminal of the mixer 32 is supplied with the low-frequency signal output from the low-frequency oscillator 24. The mixer 32 compares phases of these signals with each other and outputs a D.C. signal with the polarity corresponding to the phase difference and at a level corresponding to the operating point drift.

The output signal of the mixer 32 is passed through a low-pass filter 33 allowing the signal with frequencies lower than a predetermined frequency to pass therethrough and supplied to one input terminal of a differential amplifier 34. The other input terminal of the differential amplifier 34 is connected with the ground potential of the circuit. The output of the differential amplifier 34 is connected with the bias tee 27.

Figure 6:
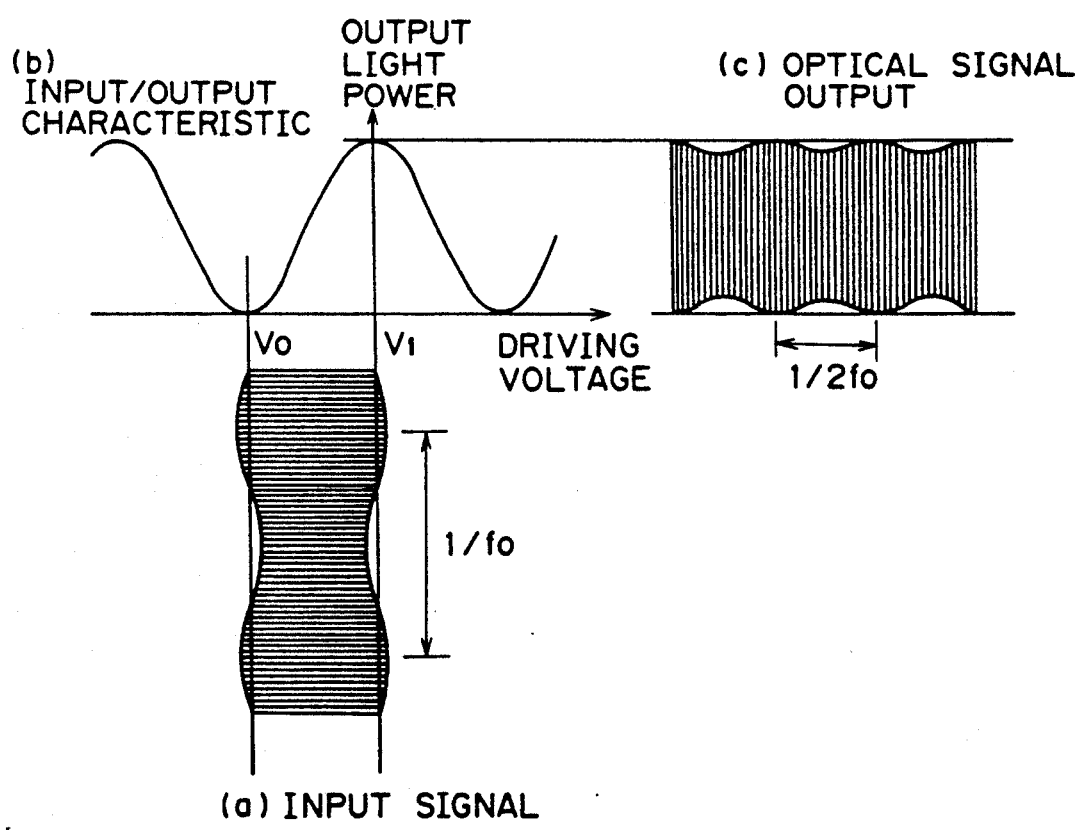
FIG. 6 is a diagram for explaining the waveform of the output optical signal of a Mach-Zehnder optical modulator when there is produced no operating point drift.
Figure 7:
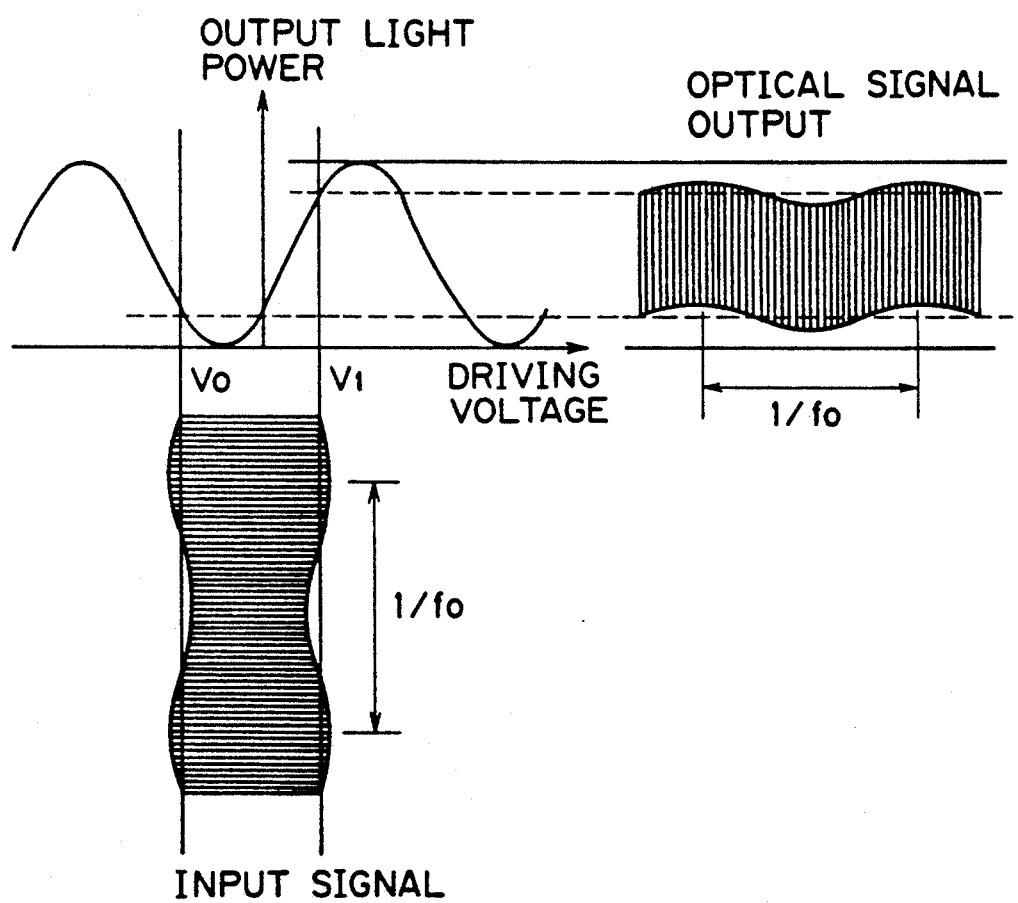
FIG. 7 is a diagram for explaining the waveform of the output optical signal of a Mach-Zehnder optical modulator when there is produced an operating point drift in the positive direction.
Figure 8:
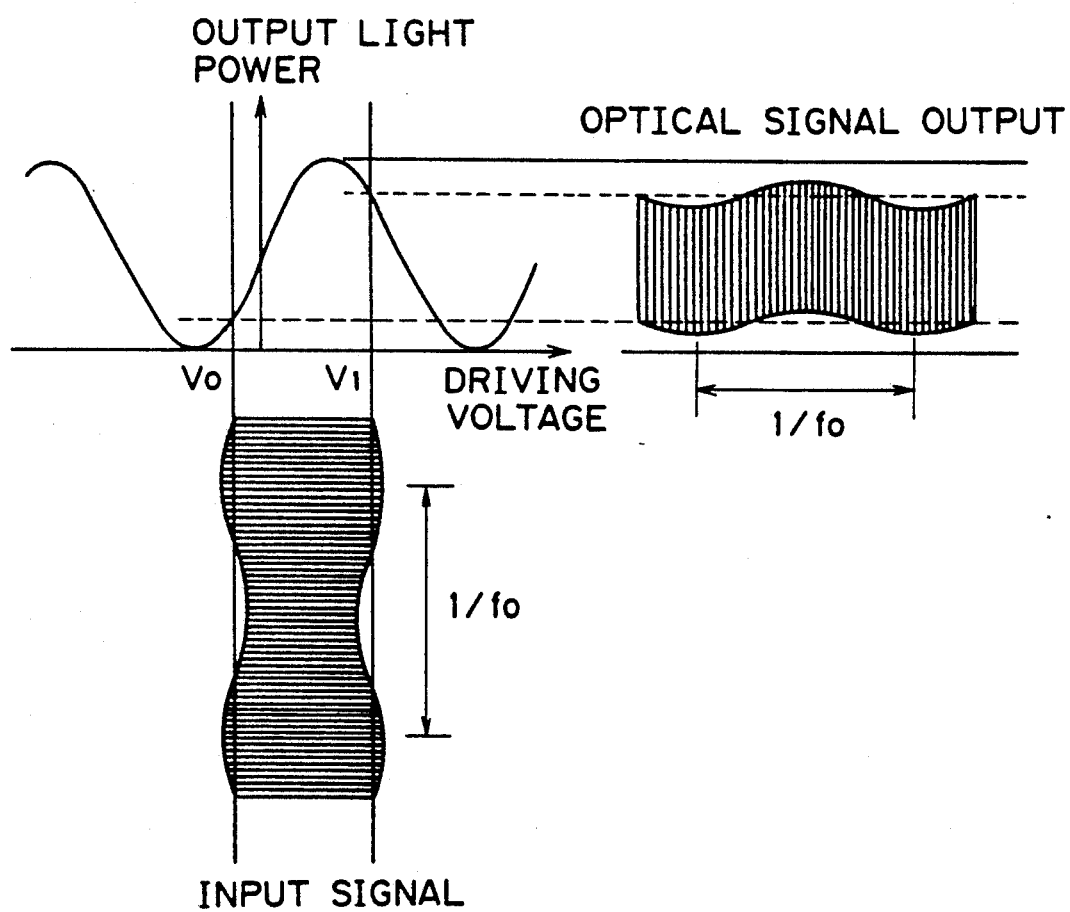
FIG. 8 is a diagram for explaining the waveform of the output optical signal of a Mach-Zehnder optical modulator when there is produced an operating point drift in the negative direction.

FIG. 6 is a diagram showing the waveform of the optical signal output from the optical modulator when there is produced no operating point drift, FIG. 7 is a diagram showing the waveform of the output optical signal when there is produced an operating point drift in the positive direction, and FIG. 8 is a diagram showing the waveform of the output optical signal when there is produced an operating point drift in the negative direction. Control operations of the operating point of the Mach-Zehnder optical modulator 22, in accordance with the operating point drift thereof, will be described below with reference to FIG. 6 to FIG. 8.

The waveform of the input signal to be converted into an optical signal in the Mach-Zehnder optical modulator 22 is such that a low-frequency signal is superposed on the input signal as indicated by (a) in FIG. 6. When the Mach-Zehnder optical modulator 22 having the input/output characteristic (operational characteristic curve) indicated by (b) in FIG. 6 is driven with such input signal as described above, an output optical signal amplitude-modulated with a signal having a frequency of 2f0 can be obtained as indicated by (c) in FIG. 6.

In the state where there is produced no operating point drift, since the driving voltages V0 and V1 corresponding to both of the logic levels of the input signal are set to be the adjoining minimum value and maximum value on the input/output characteristic of the Mach-Zehnder optical modulator 22, the low-frequency signal superposed on the input signal is modulated such that the phases corresponding to the "0" level and "1" level of the input signal are opposite to each other. Accordingly, no frequency component with the frequency f0 is detected from the output of the band amplifier 31.

However, when an operating point drift is produced, the low-frequency signal superposed on the input signal is modulated such that the phases corresponding to the "0" level and "1" level of the input signal are in phase as shown in FIG. 7 and FIG. 8. The average power of the output optical signal varies at the frequency f0 according to such in-phase modulation and the phase of the frequency component with the frequency f0 takes values being opposite by an angle of 180° depending on the direction of the operating point drift in the Mach-Zehnder optical modulator 22. Therefore, a D.C. signal with the polarity corresponding to the phase difference between the phase of the frequency component the frequency f0 and the phase of the low-frequency signal output from the low-frequency oscillator 24 and at the level corresponding to the degree of the operating point drift is obtained at the output of the mixer 32.

The differential amplifier 34, in response to such signal corresponding to the operating point drift, controls the bias voltage (D.C. component of the driving voltage) so that no frequency component with the frequency f0 may be included in the output optical signal and thereby maintains the optimum operating point compensated for the operating point drift.

The operating point of the Mach-Zehnder optical modulator is controlled by changing the phase of lightwave in optical waveguides of the Mach-Zehnder modulator. The phase of lightwave in optical waveguides is changed by varying refractive index of the optical waveguides using electrooptical effect (the above described embodiment), or by varying the length of the optical waveguides using thermal expansion, or by varying the length of the optical waveguides using Piezo effect.

The voltage for controlling the operating point is supplied to the electrode which is commonly used for driving, or to the electrode fabricated for control use only.

Fabricating the electrode for control use separately from the electrode for drive use has merit that driving waveform is free from deterioration caused by inpedance mismatching.

In the above described embodiment, the driving voltage is supplied through the bias tee. The capacitor 26 and the bias tee 27 may be eliminated if the D.C. output voltage of the drive amplifier 25 is adjustable. Further, the mixer 32 may be replaced with an IC performing analog multiplication.

The principle of operation of the operating point control in accordance with the operating point drift will be quantitatively described below.

Having the amplitude ($=|V0-V1|$) of the input signal corresponding to the logical values of the input signal represented by $V\pi$, having the value obtained by normalizing the power of the optical signal output with its maximum value represented by p and having the value obtained by normalizing the driving voltage with $V\pi$ represented by v, the input/output characteristic of the optical modulator 22 is given by $$p(v) = (1 - \cos(\pi(v-vd)))/2,$$

where vd represents the voltage of the operating point drift normalized with $V\pi$.

Now, if an amplitude modulation is applied to an input signal corresponding to the input signal whose amplitude is $V\pi$ with a low-frequency signal with a frequency of $f_0(=\omega_0/2\pi)$ at a modulation factor m, then, the normalized driving voltages $V_0$ and $V_1$ corresponding to the logical levels "0" and "1" of the input signal are given by $$V_0 = m \sin(\omega_0 t),$$

$$V_1 = 1 - m \sin(\omega_0 t).$$

When m is sufficiently small, the power $P_0$ and $P_1$ of the output optical signals corresponding to the logical levels are given by approximate expressions as $$\begin{aligned} p_0 &= p(v_0) \\ &\approx (1 - \cos(\pi vd) - \\ &\quad \pi\, m\sin(\omega_0 t)\sin(\pi vd))/2, \end{aligned}$$

$$\begin{aligned} p_1 &= p(v_1) \\ &\approx (1 + \cos(\pi vd) - \\ &\quad \pi\, m\sin(\omega_0 t)\sin(\pi vd))/2. \end{aligned}$$

Further, the average power $P_z$ of the output optical signal at the time of rise and fall of the input signal is given by an approximate expression as $$\begin{aligned} p_z &= \frac{1}{v_1 - v_0}\int_{v_0}^{v_1} p(v)dv \\ &= \tfrac{1}{2} - \cos(\pi v_0)\sin(\pi vd)/(\pi(1 - 2v_0)) \\ &\approx \tfrac{1}{2} - ((1 + 2m\sin(\omega_0 t))/\pi)\sin(\pi vd). \end{aligned}$$

Figure 9:
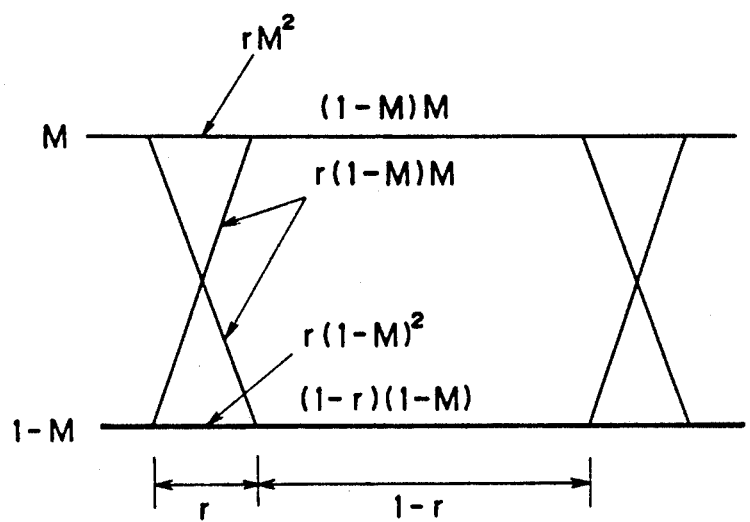
FIG. 9 is a diagram showing the probability of occurrence of each logic value of an input signal in an eye pattern.

FIG. 9 is a diagram showing the probability of occurrence of each logical value of an input signal in an eye pattern.

Referring to FIG. 9, M represents the mark-space ratio of the input signal and r represents a constant showing the relationship between the bit rate fb of the input signal and the time ($=r(1/fb)$) for the rise and fall of the input signal.

Hence, using such probability of occurrence, the power Pav of the output optical signal averaged for the time sufficiently smaller than the period ($=1/f0$) of the low-frequency signal superposed on the input signal is give by the expression $$\begin{aligned} p_{av} &= (r(1-M)^2 + (1-r)(1-M))p_0 + \\ &\quad (rM^2 + (1-r)M)P_1 + 2r(1-M)Mp_2 \\ &= K_0 p_0 + K_1 p_1 + K_2 p_2, \end{aligned}$$

where K0, K1, and K2 represent the proportional coefficients in the above expression.

Accordingly, the component pf0 with the frequency f0 of the low-frequency signal included in the power Pav of the output optical signal is given by $$pf_0 = -\{((r(1-M)^2 + (1-r)(1-M)) + (rM^2 + (1-r)M))(\pi/2) + 2r(1-M)M(\pi/2)\} \times m\sin(\pi v_d)\sin(\omega_0 t).$$

Thus, the component pf0 with the frequency f0 has an opposite phase, i.e., out of phase by 180°, depending on the direction of the operating point drift (polarity of vd). By multiplying the frequency component pf0 by the reference frequency $\sin(\omega_0 t)$, the D.C. component of positive or negative sign corresponding to the direction of the operating point drift can be detected. By controlling this D.C. component so that it may become "0", the optimum operating point can be maintained.

Since the state where the frequency component pf0 is always "0" is only attained when the operating point drift vd is "0", the optimum operating point can be maintained not relying on the parameters M and r which vary with the waveform of the input signal.

The problem caused when the low-frequency signal is superposed on one side of the logic levels will be quantitatively described below.

When the low-frequency signal is superposed on the logical level "1", the normalized driving voltages $V_0'$ and $V_1'$ corresponding to the logical levels "0" and "1" of the input signal are given by $$V_0' = 0,$$

$$V_1' = 1 - m\sin(\omega_0 t).$$

When m is sufficiently small, the normarized power $P_0'$ and $P_1'$ of the output optical signals corresponding to the logical levels are given by approximate expressions as $$p_0' = (1 - \cos(\pi v_d))/2,$$
$$p_1' = p(v_1)$$
$$\approx (1 + \cos(\pi v_d) - \pi m \sin(\omega_0 t)\sin(\pi v_d))/2.$$

Further, the normalized average power $P_2'$ of the output optical signal at the time of rise and fall of the input signal is given by an approximate expression as $$p_2' = \frac{1}{v_1' - v_0'} \int_{v_0'}^{v_1'} p(v) dv$$
$$= \frac{1}{2} - \frac{\sin(\pi(v_1' - v_d)) + \sin(\pi v_d)}{2\pi v_1'}$$
$$\approx \frac{1}{2} - \frac{\sin(\pi v_d)}{\pi} - \frac{m}{2\pi}(\pi\cos(\pi v_d) + 2\sin(\pi v_d))\sin(\omega_0 t) - (\frac{1}{4})\cos(\pi v_d)(m\sin(\omega_0 t))^2.$$

The normalized power pav' of the output optical signal is given by the expression $$p_{av}' = K_0 p_0' + K_1 p_1' + K_2 p_2'.$$

Accordingly, the component pf0' with the frequency f0 of the low-frequency signal included in the power pav' of the output optical signal is given by $$p_{f0}' = -\{K_1(\pi/2)\sin(\pi v_d) + K_2(\tfrac{1}{2}\pi)(\pi\cos(\pi v_d) + 2\sin(\pi v_d))\} \times m\sin(\omega_0 t)$$
$$= Km\sin(\pi v_d + \theta)\sin(\omega_0 t).$$

Here K and $\theta$ are given by $$K = ((K_2/2)^2 + (\pi K_1/2 + K_2/\pi)^2)^{\frac{1}{2}},$$

$$\theta = \tan^{-1}(\pi K_2/(\pi^2 K_1 + 2K_2)).$$

Accordingly, pf0'=0 when $\sin(\pi V_d + \theta) = 0$. So, the operating point is controlled at the point where $v_d = -\theta/\pi$, not at the optimum point where vd=0. $\theta$ depends on the time for the rise and fall of the input signal and on the mark-space ratio.

According to the present invention, as described above, the optimum operating point can be maintained without relying on the input signal, but according to the operating point drift in the optical modulator. As a result, the optical signal output from the optical modulator can be stabilized and its extinction ratio can be prevented from being degraded.

Figure 10:
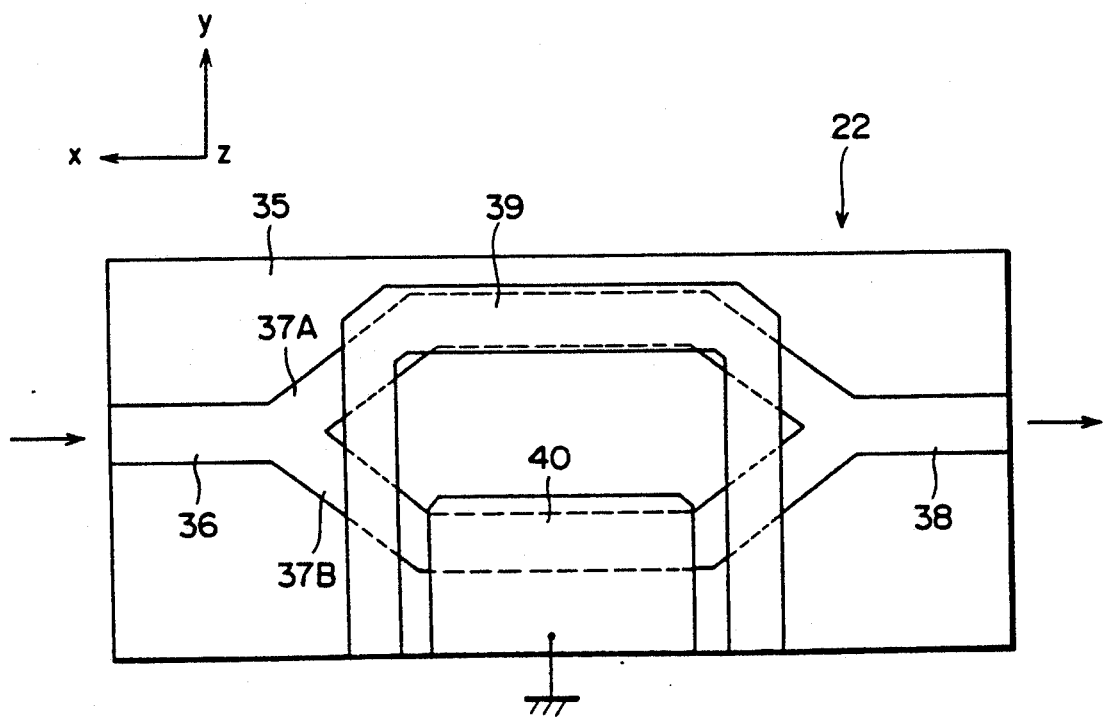
FIG. 10 is a diagram showing an example of arrangement of a Mach-Zehnder optical modulator.

FIG. 10 is a diagram showing a structure of a Mach-Zehnder optical modulator 22. This Mach-Zehnder optical modulator 22 is fabricated by forming an optical waveguide on the Z-cut plane of LiNbO3 by such a method as thermal diffusion of Ti and mounting electrodes on the optical waveguide. Reference numeral 35 denotes a waveguide substrate, 36 denotes an optical waveguide on the input side, 37A and 37B denote waveguide paths divided from the input optical waveguide 36, and 38 denotes an optical waveguide on the output side formed by the divided waveguide paths 37A and 37B joining together, 39 denotes a traveling-wave electrode chiefly mounted on the divided waveguide path 37A, and 40 denotes an earth electrode mounted on the divided waveguide path 37B. A driving voltage is supplied to the traveling-wave electrode 39 and the earth electrode 40. Further, a bias voltage is supplied to the traveling-wave electrode 39. In the Mach-Zehnder optical modulator 22 of the described arrangement, since the traveling-wave electrode 39 and the earth electrode 40 are formed asymmetrically, the field strengths impressed on the divided waveguide paths 37A and 37B become different and, hence, at the times of the rise and fall of the pulse of the output optical signal, differences in its wavelength are produced. As a result, there occurs improvement or deterioration in the waveform of the transmitted signal depending on whether the wavelength dispersion within the optical fiber is positive or negative.

Figure 11:
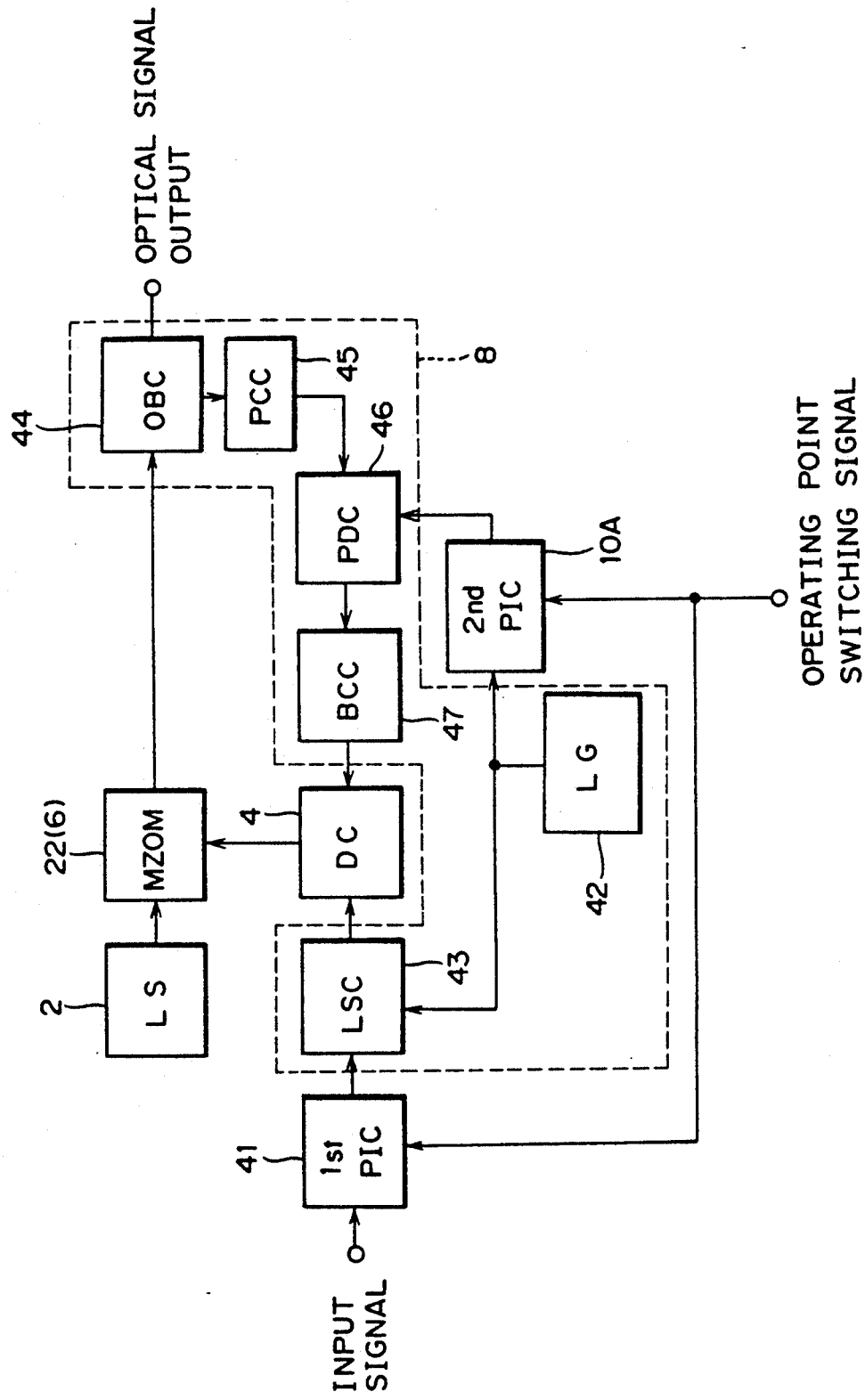
FIG. 11 is a block diagram showing a first embodiment of the optical transmitter shown in FIG. 3.

FIG. 11 is a block diagram showing a first embodiment of the optical transmitter shown in FIG. 3. By the use of this optical transmitter, the waveform deterioration due to the wave-length dispersion can be prevented from occurring whether the sign of the wavelength dispersion is positive or negative.

As the light source 2, a laser diode driven by a stationary current can be used. The optical modulator 6 is the Mach-Zehnder optical modulator as shown in FIG. 10 just as in the preceding embodiment. The Mach-Zehnder optical modulator 22 is supplied with the driving voltage from the drive circuit 4 and the bias voltage therefor is controlled by the action of the operating point stabilizing circuit 8, exerted thereon through the drive circuit 4. Reference numeral 41 denotes a first polarity inverting circuit for inverting the polarity of the input signal in response to shifting of the operating point by an operating point shifting circuit.

The operating point stabilizing circuit 8 comprises a low-frequency signal oscillator 42 outputting a low-frequency signal with a predetermined frequency (=f0), a low-frequency superposing circuit 43 for amplitude-modulating the input signal with the above described low-frequency signal and delivering the modulated signal to the drive circuit 4, an optical branching circuit 44 for branching the optical signal output from the Mach-Zehnder optical modulator 22, a photoelectric converting circuit 45 for converting one of the branched optical signals into an electric signal, a phase detector circuit 46 detecting the frequency component of the aforesaid low-frequency signal included in the above described electric signal and comparing the phase of the frequency component with the phase of the low-frequency signal, thereby outputting a D.C. signal with the polarity corresponding to the phase difference and at the level corresponding to the operating point drift, and a bias control circuit 47 for feedback-controlling the bias for the Mach-Zehnder optical modulator 22 so that the above D.C. signal may become zero.

The phase detector circuit 46 can be formed of a mixer, a low pass filter, and the like just as in the preceding embodiment. The bias control circuit 47 can be constructed with an operational amplifier or the like.

As the operating point shifting circuit in the present embodiment, a second polarity inverter circuit 10A for inverting the polarity of the low-frequency signal input to the phase detector circuit 46 (shifting the phase of the low-frequency signal by 180°) in response to an operating point switching signal is used.

Figure 12:
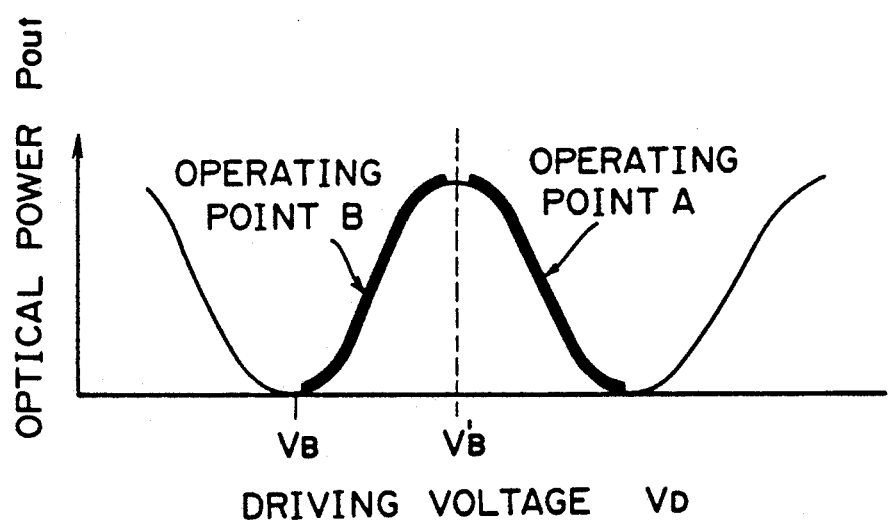
FIG. 12 is a diagram explaining preferred operating points of a Mach-Zehnder optical modulator.
Figure 13:
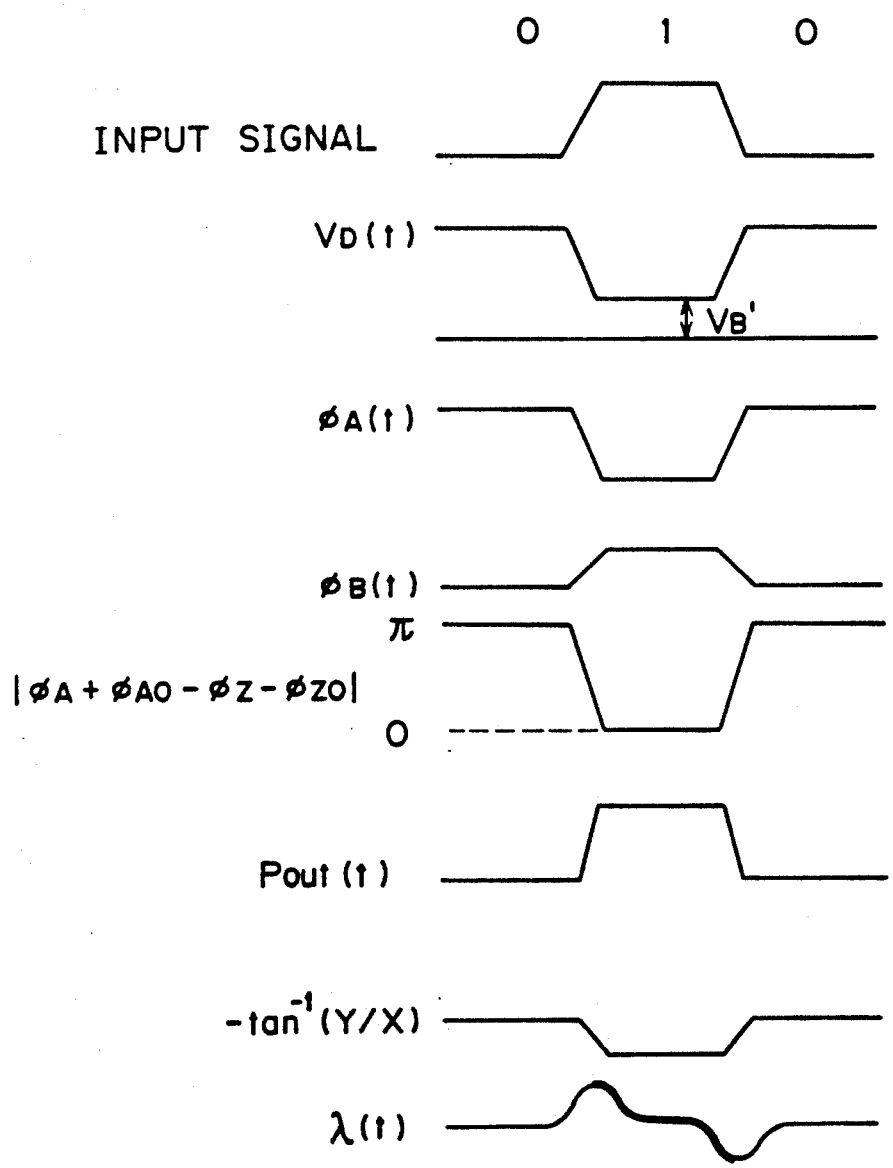
FIG. 13 is a diagram showing various waveforms obtained when the Mach-Zehnder optical modulator is operated at the operating point A shown in FIG. 12.
Figure 14:
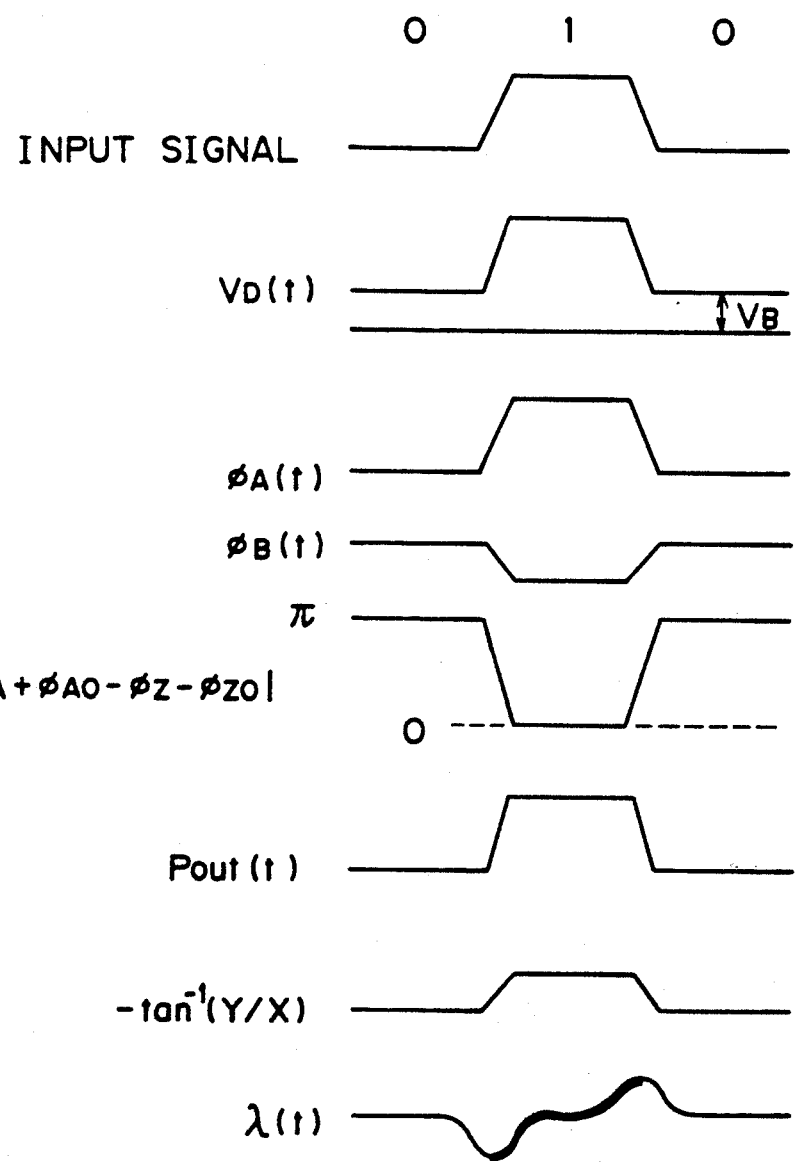
FIG. 14 is a diagram showing various waveforms obtained when the Mach-Zehnder optical modulator is operated at the operating point B shown in FIG. 12.

FIG. 12 is a diagram for explaining preferred operating points on the operational characteristic curve. Referring to this diagram, the operating point A represents the middle point of the falling portion of the operational characteristic curve and the operating point B represents the middle point of the rising portion of the curve. FIG. 13 is a diagram showing various waveforms obtained during the operations at the operating point A, and FIG. 14 is a diagram showing various waveforms obtained during the operations at the operating point B.

In the following description, $E_O$ represents the amplitude of an input optical electric-field, $\omega_O$ represents the angular frequency of the input optical electric-field, t represents time, and $\phi_A$ and $\phi_B$ represent the phases modulated with the driving voltage waveform VD(t) in the divided waveguide paths 37A and 37B. $\phi_{AO}$ and $\phi_{BO}$ respectively represent phase changes in the optical electric-field produced in the divided waveguide paths 37A and 37B when VD(t) is O. VB and VB' represent bias voltages.

Neglecting the loss produced within the optical modulator, the optical electric-field in each portion may be expressed as follows.

Input optical electric-field:

$$E_{IN}(t) = E_O \cos(\omega_O t) \quad (1)$$

Optical electric-field at the output portion of the divided waveguide path 37A:

$$E_A(t) = E_O \cos(\omega_O t + \phi_A(V_D(t)) + \phi_{AO})/\sqrt{2} \quad (2)$$

Optical electric-field at the output portion of the divided waveguide path 37B:

$$E_B(t) = E_O \cos(\omega_O t + \phi_B(V_D(t)) + \phi_{BO})/\sqrt{2} \quad (3)$$

Output optical electric-field:

$$\begin{aligned}E_{out}(t) &= (E_A(t) + E_B(t))/\sqrt{2} \\ &= E_O/2 \cdot (X^2 + Y^2)^{\frac{1}{2}} \cdot \cos(\omega_O t - \tan^{-1}(Y/X))\end{aligned} \quad (4)$$

where $$X = \cos(\phi_A(V_D(t)) + \phi_{AO}) + \cos(\phi_B(V_D(t)) + \phi_{BO}) \quad (5)$$

$$Y = \sin(\phi_A(V_D(t)) + \phi_{AO}) + \sin(\phi_B(V_D(t)) + \phi_{BO}) \quad (6)$$

The variation in the wavelength is expressed, using the phase-modulation term $\tan^{-1}(Y/X)$ of expression (4), as follows.

By representing the phase component $\omega_O t - \tan^{-1}(Y/X)$ of the optical electric-field of expression (4) by $\Phi(t)$, the angular frequency of the output light $\omega(t) = d(\Phi(t))/dt$. Then, from the wavelength $\lambda(t) = 2\pi c/\omega(t)$, $$\begin{aligned}\lambda(t) &= 2\pi c/\omega(t) \\ &= 2\pi c/(\omega_0 - d(\tan^{-1}(X/Y))/dt)\end{aligned} \quad (7)$$

Meanwhile, the output light intensity $$P_{out}(t) = (E_O/2)^2 \cdot (X^2 + Y^2). \quad (8)$$

If the voltage applied to the traveling wave electrode 39 is increased, the phase of the light propagated through the divided waveguide path 37A leads, while the phase of the light propagated through the divided waveguide path 37B lags. More specifically, because of the asymmetry of the mounted electrodes, the electric field on the divided waveguide path 37A becomes stronger than the electric field on the divided waveguide path 37B and, hence, the phase modulation in the divided waveguide path 37A becomes greater. Thus, whenever the voltage applied to the traveling wave electrode 39 is increased, the phase of the output light of this modulator comes to lead. On the other hand, when the voltage applied to the traveling wave electrode is increased, the light intensity may increase or decrease depending on the initial phase difference between the light beams propagated through the divided waveguide paths 37A and 37B. Changing the operating point corresponds to changing the initial phase differnece between the light beams propagated through the divided waveguide paths 37A and 37B by the control of the bias voltage. Thus, it becomes possible to allow the phase of the light to lead or lag at the time of rise of the output optical pulse by changing the condition whereby the operating point is set up. When the phase leads, the wavelength is temporarily shortened, whereas when the phase lags, the wavelength is temporarily prolonged. In this way, by setting up the operating point, the change in the wavelength taking place in the output optical pulse can be set to be either from short wavelength to long wavelength or from long wavelength to short wavelength.

In the present embodiment, since there is provided the first polarity inverting circuit 41 for inverting the polarity of the input signal according to the shifting of the operating point, the correspondence between the polarity of the input signal and the polarity of the output light waveform is held unchanged as shown in FIG. 13 and FIG. 14, when the operating point is shifted by half a cycle on the operational characteristic curve so that the wavelength within the optical pulse may be changed as described above.

When the optical modulator is driven at the operating point A, the first half of the output optical pulse comes to have longer wavelength and the second half thereof comes to have shorter wavelength. When the optical modulator is driven at the operating point B, the first half of the output optical pulse comes to have shorter wavelength and the second half thereof comes to have longer wavelength.

Figure 15:
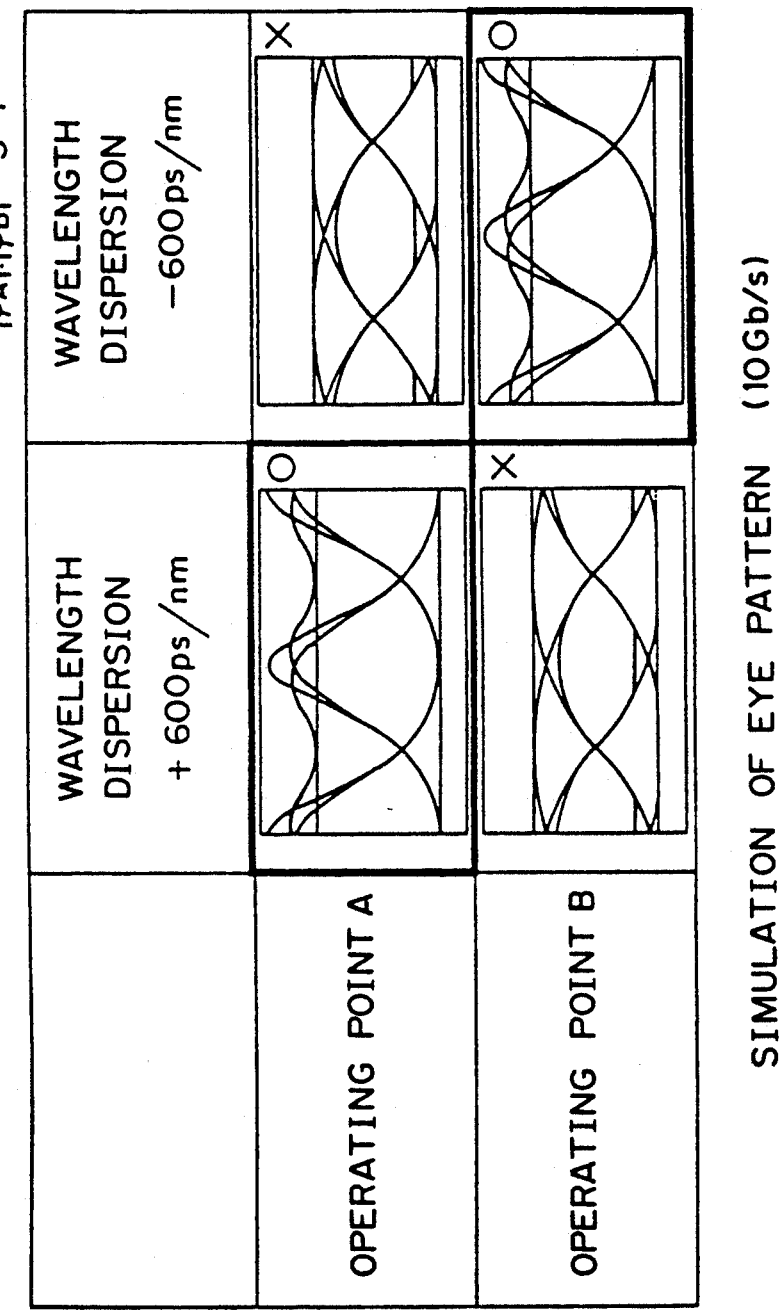
FIG. 15 is a diagram showing results of simulation of changes in the eye pattern.

Changes in the eye pattern obtained as the results of simulation when the optical modulator is driven at the operating point A and the operating point B and the then obtained optical outputs are transmitted through optical fibers whose wavelength dispersion is +600 ps/nm and −600 ps/nm are shown in FIG. 15. The bit rate of the input signal at that time was 10 Gb/s. Further, $|\phi_A|:|\phi_B| = 5:1$. When the wavelength dispersion is positive, the eye pattern is improved when the modulator is driven at the operating point A, whereas when the wavelength dispersion is negative, the eye pattern is improved when the modulator is driven at the operating point B. Thus, whether the sign of the wavelength dispersion is positive or negative, the waveform deterioration due to the wavelength dispersion can be prevented from occurring.

Figure 16:
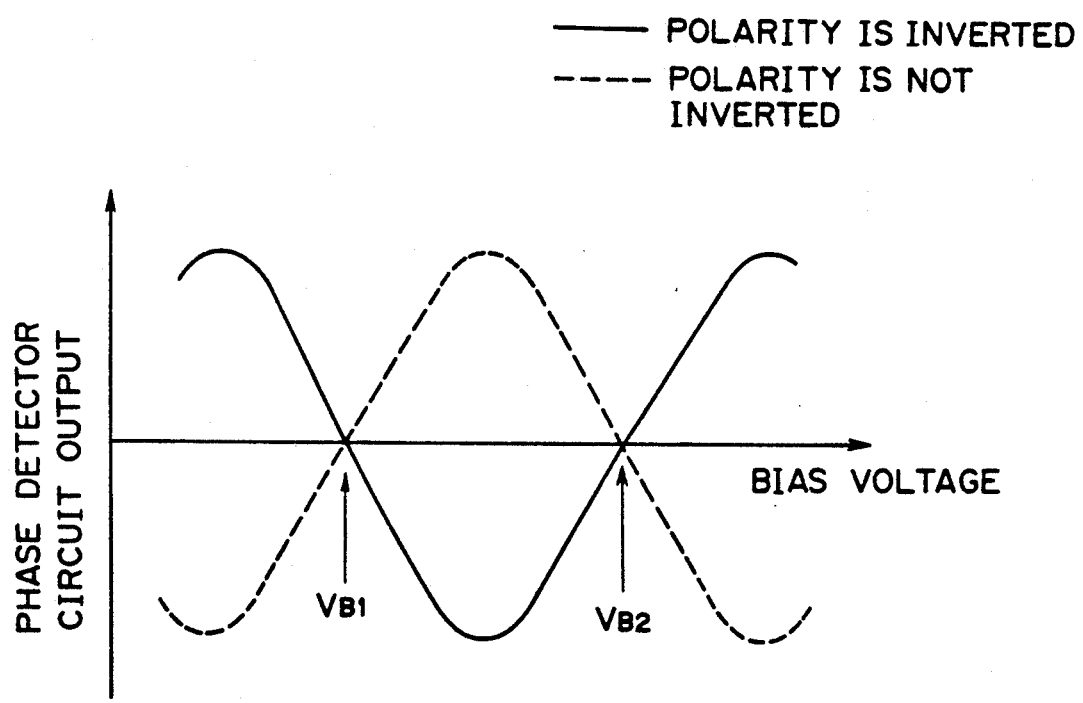
FIG. 16 is a graph showing relationships between the bias voltage for a Mach-Zehnder optical modulator and the output of a phase detector circuit.

In the present embodiment, the second polarity inverting circuit 10A for inverting the polarity of the low-frequency signal input to the phase detector circuit 46 according to the operating point switching signal is used as the operating point shifting circuit 10. FIG. 16 is a graph showing relationships between the bias voltage for the optical modulator 22 and the output of the phase detector circuit 46. The broken line indicates the case where the polarity of the low-frequency signal is not inverted and the solid line indicates the case where the polarity of the low-frequency signal is inverted. By means of feedback control performed by the bias control circuit 47, the bias voltage, when the polarity is not inverted, is brought to the stabilized voltage at VB1 and the bias voltage, and when the polarity is inverted, is brought to the stabilized voltage at VB2. In this way, by inverting the polarity of the low-frequency signal input to the phase detector circuit 46, the operating point can be shifted so that the effect of the wavelength dispersion may be minimized.

Figure 17:
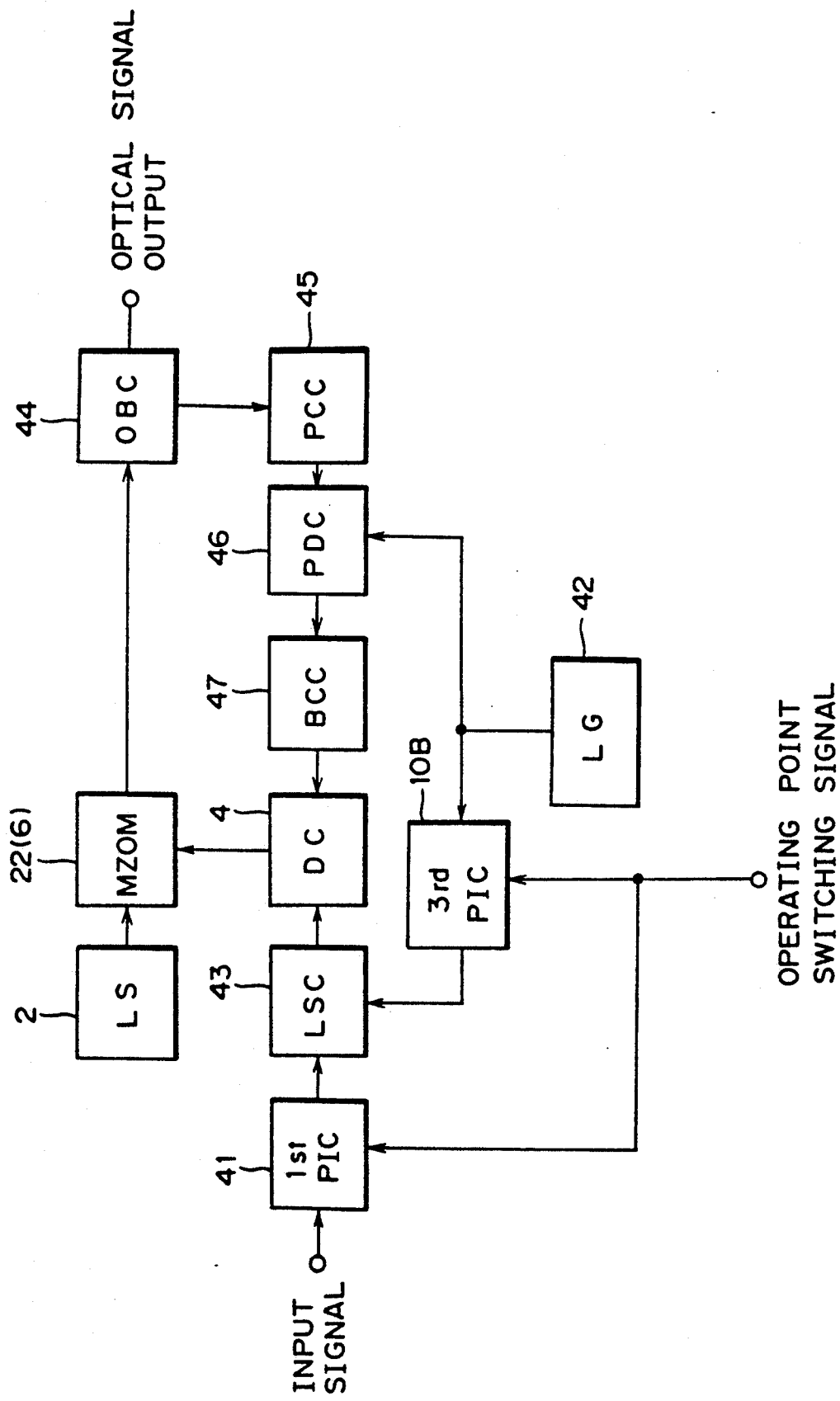
FIG. 17 is a block diagram showing a second embodiment of the optical transmitter shown in FIG. 3.

FIG. 17 is a block diagram showing a second embodiment of the optical transmitter shown in FIG. 3. In this embodiment, there is provided a third polarity inverting circuit 10B as the operating point shifting circuit, instead of the second polarity inverting circuit 10A in the first embodiment, for inverting the polarity of the low-frequency signal input to the low-frequency signal superposing circuit 43 according to the operating point switching signal. That is, the operating point of the optical modulator 22 is shifted not by inverting the polarity of the low-frequency signal input to the phase detector circuit 46 but by inverting the polarity of the low-frequency signal input to the low-frequency signal superposing circuit 43.

Figure 18:
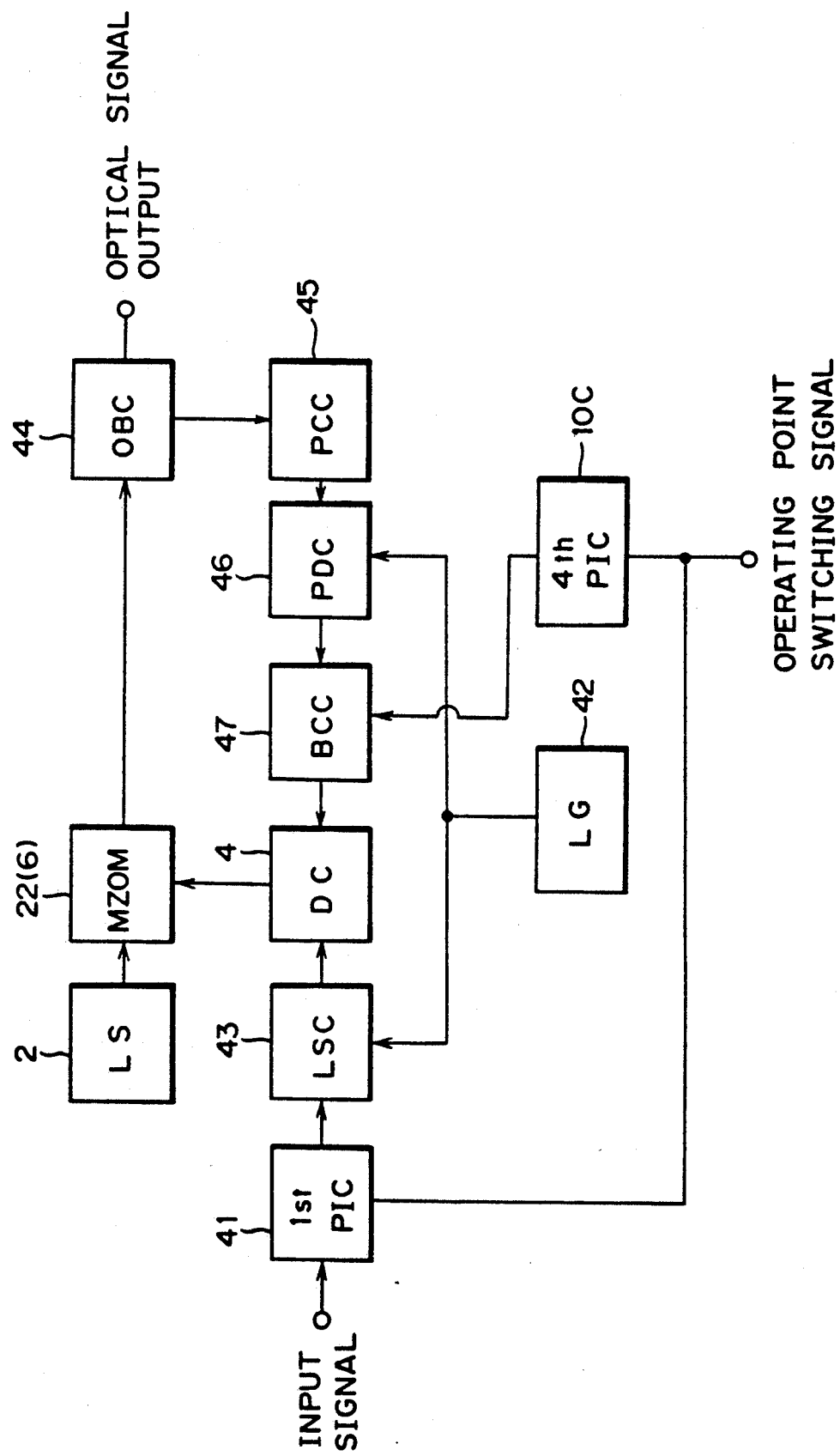
FIG. 18 is a block diagram showing a third embodiment of the optical transmitter shown in FIG. 3.

FIG. 18 is a block diagram showing a third embodiment of the optical transmitter shown in FIG. 3. In this embodiment, a fourth polarity inverting circuit 10C is used, as the operating point shifting circuit 10, for inverting the polarity of the feedback loop in the photoelectric converting circuit 45, the phase detector circuit 46, or the bias control circuit 47.

Also in the second and the third embodiment, the effect of the wavelength dispersion can be minimized, by the same as in the first embodiment, by shifting the operating point of the Mach-Zehnder optical modulator 22 by half a cycle on the operational characteristic curve according to the wave dispersion characteristic of the optical fiber used as the optical transmission line.

Figure 19:
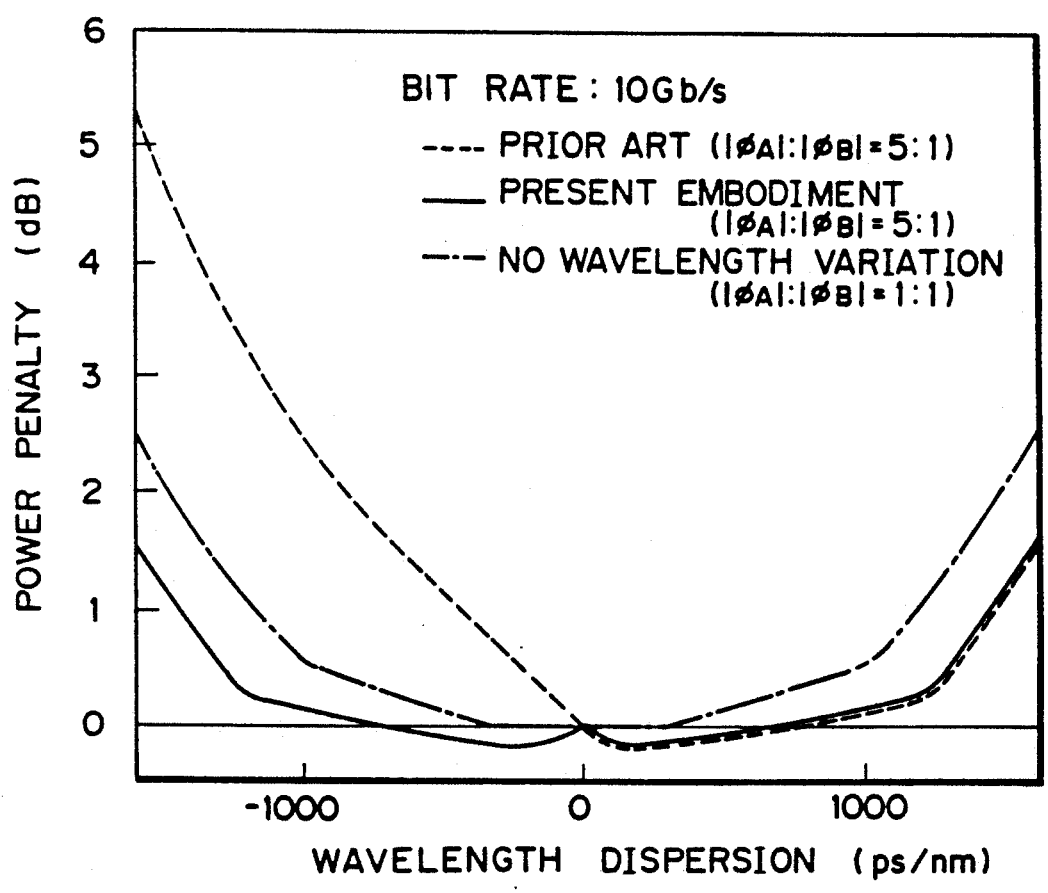
FIG. 19 is a graph showing relationships between wavelength dispersion and power penalty.

FIG. 19 is a graph showing the relationship between the wavelength dispersion and the power penalty for explaining the effects in the embodiment of the optical transmitter shown in FIG. 3. The broken line corresponds to the device of the prior art, the solid line corresponds to the present embodiment in which an optimum operating point is set up according to the sign of the wavelength dispersion, and the one-dot-chain line corresponds to the case where there is no wavelength variation in the light source. Here, the power penalty is what is defined as follows.

(Power Penalty) = 10 $\log_{10}$ (the minimum received light power when there is wavelength dispersion/the minimum received light power when wavelength dispersion is zero) (dB).

It is known from FIG. 19 that the resistivity to the wavelength dispersion is greatly improved over that in the prior art by the present invention. Further, it is known that the resistivity to the wavelength dispersion is improved even over the case where there is no variation in the wavelength (where the phase-modulating efficiencies are 1:1) by the present invention.

According to the present invention, as described so far, good transmission characteristics can be obtained whether the wavelength dispersion of the optical fiber is positive or negative, and allowable dispersion can be enlarged in the system used in the zero-dispersion wavelength region of an optical fiber and, thereby, transmission over a longer distance can be achieved.

According to the present invention, the polarity of an optical signal is inverted by shifting the operating point of an optical modulator on the characteristic curve and, therefore, such a method to shift the operating point of an optical modulator on the characteristic curve is also useful as a method for merely inverting the polarity of an optical signal.

In the foregoing description, the present invention has been described as related to specific embodiments, but the invention is not limited to the details of these embodiments. For example, in the embodiment (shown in FIG. 11, FIG. 17, and FIG. 18) of the optical transmitter of FIG. 3, the transmission characteristics can be improved, the same as in the case where the polarity of the input signal is inverted, not by inverting the polarity of the input signal by means of the first polarity inverting circuit but only by shifting the operating point of the optical modulator by half a cycle on the operational characteristic curve. In such case, because the polarity of the signal is inverted, it is desirable that a means for matching the polarity of the signal is separately provided in the receiver or the like. The preferred embodiments described herein are therefore illustrative and not restrictive. Since the scope of the invention is defined in the appended claims, modification and variation falling within the equivalence of bounds of the claims are all within the scope of the present invention.

What is claimed is:

1. An optical transmitter comprising:
   a laser diode;
   a drive circuit for generating a drive voltage in accordance with an input signal;
   a Mach-Zehnder optical modulator responsive to the driving voltage for modulating a light beam from said laser diode, thereby converting the input signal into an optical signal;
   a low-frequency oscillator for outputting a predetermined low-frequency signal;
   a low-frequency superposing circuit, operatively connected to said low-frequency oscillator, for amplitude-modulating the input signal by superposing the low-frequency signal on a "0" logic level and a "1" logic level of the input signal such that a phase of the low-frequency signal at the "0" logic level and a phase of the low-frequency signal at the "1" logic level are opposite to each other and outputting the modulated signal to said drive circuit;
   an optical branching circuit for branching the optical signal output from said Mach-Zehnder optical modulator;
   a photoelectric converting circuit for converting one of the optical signals branched by said optical branching circuit to an electrical signal;
   a phase detector circuit, operatively connected to said low-frequency oscillator, for detecting a frequency component of the low-frequency signal included in the electrical signal and comparing a phase of the frequency component with a phase of the low-frequency signal, thereby outputting a D.C. signal having a polarity corresponding to the phase difference and at a level corresponding to a drift in an operational characteristic curve of said Mach-Zehnder optical modulator; and
   a bias control circuit, operatively connected to said drive circuit and said phase detector circuit, for feedback-controlling a bias for said optical modulator so that the D.C. signal becomes zero.

2. An optical transmitter according to claim 1, wherein an operating point of said Mach-Zehnder optical modulator is controlled by changing a phase of lightwave in optical waveguides of said Mach-Zehnder optical modulator.

3. An optical transmitter according to claim 2, wherein said low-frequency superposing circuit includes:
   an amplitude modulator for modulating an amplitude of the input signal with the low-frequency signal; and
   a filter for removing a low-frequency component from the amplitude modulated signal.

4. An optical transmitter comprising:
   a laser diode;
   a drive circuit for generating drive voltage in accordance with an input signal;
   a Mach-Zehnder optical modulator responsive to the driving voltage for modulating a light beam from said laser diode, thereby converting the input signal into an optical signal;
   a low-frequency oscillator for outputting a predetermined low-frequency signal;
   a low-frequency superposing circuit, operatively connected to said low-frequency oscillator, for amplitude-modulating the input signal with the low-frequency signal and outputting the modulated signal to said drive circuit;
   an optical branching circuit for branching the optical signal output from said Mach-Zehnder optical modulator;
   a photoelectric converting circuit for converting one of the optical signals branched by said optical branching circuit to an electrical signal;
   a phase detector circuit, operatively connected to said low-frequency oscillator, for detecting a frequency component of the low-frequency signal included in the electrical signal and comparing a phase of the frequency component with a phase of the low-frequency signal, thereby outputting a D.C. signal having a polarity corresponding to the phase difference and at a level corresponding to a drift in an operational characteristic curve of said Mach-Zehnder optical modulator;
   a bias control circuit, operatively connected to said drive circuit and said phase detector circuit, for feedback-controlling a bias for said optical modulator so that the D.C. signal becomes zero; and
   an operating point shifting circuit responsive to an operating point switching signal for shifting an operating point of said Mach-Zehnder optical modulator by half a cycle on the operational characteristic curve.

5. An optical transmitter according to claim 4, wherein said Mach-Zehnder optical modulator has optical waveguides divided into two paths which have different phase-modulating efficiencies.

6. An optical transmitter according to claim 5, wherein said optical transmitter includes a first polarity inverting circuit for inverting a polarity of the input signal according to the shift of the operating point provided by said operating point shifting circuit.

7. An optical transmitter according to claim 6, wherein said operating point shifting circuit is a second polarity inverting circuit responsive to the operating point switching signal for inverting a polarity of the low-frequency signal input to said phase detector circuit.

8. An optical transmitter according to claim 6, wherein said operating point shifting circuit is a third polarity inverting circuit responsive to the operating point switching signal for inverting a polarity of the low-frequency signal input to said low-frequency superposing circuit.

9. An optical transmitter according to claim 6, wherein said operating point shifting circuit is a fourth polarity inverting circuit responsive to the operating point switching signal for inverting a polarity of a feedback loop in said photoelectric converting circuit, phase detector circuit, or bias control circuit.

10. An optical transmitter according to claim 4, wherein the operating point is controlled by changing a phase of lightwave in optical waveguides of said Mach-Zehnder optical modulator.

11. An optical transmitter according to claim 4, wherein said low-frequency superposing circuit includes:
    an amplitude modulator for modulating an amplitude of the input signal with the low-frequency signal; and
    a filter for removing a low-frequency component from the amplitude modulated signal.

* * * * *